United States Patent [19]

Thompson

[11] Patent Number: 4,729,649
[45] Date of Patent: Mar. 8, 1988

[54] FUNCTIONAL SHIELD FOR A TELESCOPE

[76] Inventor: Charles A. Thompson, P.O. Box 514, Elgin, Ill. 60121

[21] Appl. No.: 939,943

[22] Filed: Dec. 9, 1986

[51] Int. Cl.⁴ .................. G02B 23/16; G03B 11/04
[52] U.S. Cl. ................................. 350/579; 350/580; 350/587; 350/449
[58] Field of Search ............... 350/319, 449, 579, 580, 350/581, 582, 587, 588

[56] References Cited

U.S. PATENT DOCUMENTS

| | | | |
|---|---|---|---|
| 1,368,608 | 2/1921 | Curran | 350/449 |
| 1,848,879 | 3/1932 | Halbasch | 350/581 |
| 1,971,066 | 8/1934 | Eppenstein | |
| 1,981,492 | 11/1934 | Assmus | 350/581 |
| 2,374,991 | 5/1945 | Gordon | |
| 2,875,346 | 2/1959 | Monk | |
| 2,995,997 | 8/1961 | Nieuwenhoven | 350/449 |
| 3,049,054 | 8/1962 | Waland | 350/449 |
| 3,244,896 | 4/1966 | Walker | |
| 3,502,387 | 3/1970 | Hadley | |
| 4,395,775 | 7/1983 | Roberts et al. | |
| 4,610,517 | 9/1986 | Fukino et al. | 350/580 |

FOREIGN PATENT DOCUMENTS

| | | | |
|---|---|---|---|
| 936245 | 12/1955 | Fed. Rep. of Germany | 350/580 |
| 941422 | 1/1949 | France | 350/580 |

Primary Examiner—John K. Corbin
Assistant Examiner—Terry S. Callaghan
Attorney, Agent, or Firm—Mathew R. P. Perrone, Jr.

[57] ABSTRACT

A unitary, combined-purpose, functional shield—in the shape of a hollow, generally conically shaped apertured cap for a telescope lens is used with a telescope in a straight or inverted fashion to achieve protection from dew for a telescope in general and a lens thereof in particular, while at the same time assisting in the focusing of light.

19 Claims, 13 Drawing Figures 4,729,649

FUNCTIONAL SHIELD FOR A TELESCOPE

BACKGROUND OF THE INVENTION

This invention relates to a functional shield for a telescope, and more particularly to a shield for a telescope which functions both as a light focusing assistant for the purpose of focusing light in the telescope, and as a shielding device for protecting the telescope lens from dew.

Because Galileo developed the first telescope to solve some major problems for astronomers, many additional problems are now known to astronomers. These problems exist in spite of the fact that Galileo's telescope has existed for centuries and was the first functional device to reduce problems and assist in the study of astronomy. So even with the passage of time, some problems still remain with the use and function of telescopes.

Typical of the problems that exist with telescopes is interference from stray lighting factors being received by the lens and mirror of the telescope. Stray light interferes with viewing of an astronomical body. Many planets and stars are dim. Extraneous light from any source can interfere viewing any astronomical body—and especially the dim bodies.

Another typical problem that exists with a telescope is dew formation on the telescope lens. If the lens is not clear from the foreign matter such as dew, viewing through the telescope is complicated—if not rendered impossible. Condensation is quite common from the night air—especially on telescope being set up in the cool night after being stored indoors at a warmer temperature. Accordingly, some protection from dew is very useful.

It is desired to protect the telescope from these elements without unduly interfering with the function of the telescope. Thus, if protection from dew and stray lighting can be achieved without substantial interference with the function of the telescope, great advantages are obtained.

A device to accomplish these advantages must be geometrically sturdy and easily transported. If the device is easily transported, it may be used simply while permitting more efficient use of the telescope. It is difficult to accomplish the desired protection from dew and stray lighting with such a simply transported device. The device, to provide protection from dewing and stray lighting, must also be easy to use once the telescope is set up.

Thus, it is desired to provide a device suitable for these purposes.

SUMMARY OF THE INVENTION

Therefore, it is an objective of this invention to provide a functional shield for a telescope.

A further objective of this invention is to provide a light focusing assistant for the purpose of focusing light in a telescope.

A still further objective of the invention is to provide a shielding device for protecting a telescope lens from dew.

Yet a further objective of the invention is to provide a device to minimize interference from stray lighting factors being received by the lens and mirror of a telescope.

Also an objective of this invention is to provide a device to minimize dew formation on a telescope lens.

Another objective of this invention is to provide a device to minimize deposit of foreign matter on a telescope lens.

Still another objective of this invention is to provide a protecting device for a telescope which minimizes interference with the function of a telescope.

Yet another objective of this invention is to provide a device for use with a telescope, which is geometrically sturdy.

A further objective of this invention is to provide a device for use with a telescope, which is easily transported.

A still further objective of the invention is to provide a device for use with a telescope lens, which is to use once a telescope is set up.

Yet a further objective of this invention is to provide a method for assisting with the focusing of light in a telescope.

Also an objective of this invention is to provide a method for minimizing dew formation on a telescope lens.

These and other objectives of the invention (which other objectives become clear by consideration of the specification, claims and drawings as whole) are met by providing a unitary, combined-purpose, functional shield—usually in the shape of a hollow, generally conically shaped apertured cap for a telescope lens; which is used in a straight or inverted fashion to achieve protection from dew for a telescope in general and a lens thereof in particular, while at the same time assisting in the focusing of light.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

A functional shield for a telescope serves two purposes. The shield protects the telescope lens from a collection of dew and assists in the focusing of light from the astronomical bodies being observed. This feature is accomplished by a generally conically shaped functional shield having a base of sufficient size to cover the light receiving end of a telescope.

Figure 1:
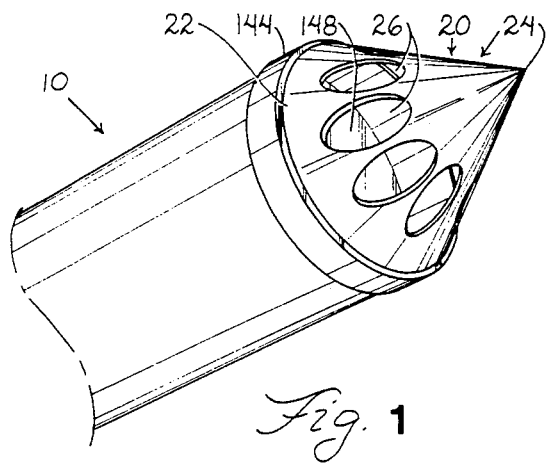
FIG. 1 depicts a perspective of telescope 10 with cone 20 in place.

Referring now to FIG. 1, telescope 10 is shown with the functional shield in the shape of cone 20. Cone 20 has a base 22 on the light receiving end 144 of telescope and the vertex 24 oppositely disposed therefrom. Apertures 26 are uniformly placed around the cone 20 so that the placement of the apertures 26 is substantially symmetrical. It is through apertures 26 that light passes into the receiving end 144 to permit viewing through the telescope 10 in proper fashion. By the presence of cone 20 on light receiving end 144, formation of dew on the light receiving lens 148 is prevented or minimized.

FIG. 1 depicts cone 30 without telescope tube extender 30 in place for clarity. When cone 20 is used in conjunction with telescope extender 30, maximum benefit for stray light prevention and dew prevention is achieved.

Figure 2:
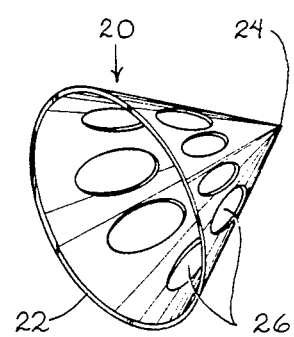
FIG. 2 depicts a rear perspective view of cone 20 from base 22 removed from telescope 10.

Referring now to FIG. 2, cone 20 is depicted from a reverse perspective view to show base 22 and vertex 24 with the spacing of apertures 26. In this fashion, the complete structure of the cone 20 used as the functional shield may be observed. It is clear, from this disclosure, that base 22 is adjustable in diameter to fit any size telescope lens.

Figure 3:
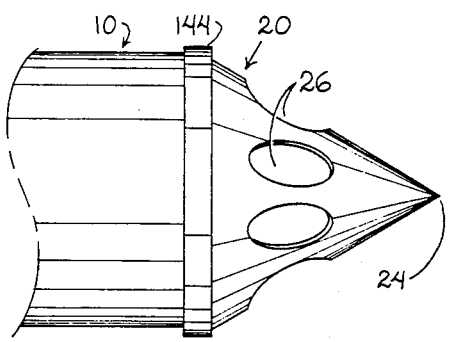
FIG. 3 depicts a side view of cone 20 secured to telescope 10.

When considering to FIG. 3, a side view of FIG. 1 is depicted. Telescope 10 is shown from the side with the functional shield in the shape of cone 20. Cone 20 has a base 22 on the light receiving end 144 of telescope 10 and the vertex 24 oppositely disposed therefrom. Apertures 26 are uniformly placed around the cone 20 so that the placement of the apertures 26 is substantially symmetrical.

Figure 4:
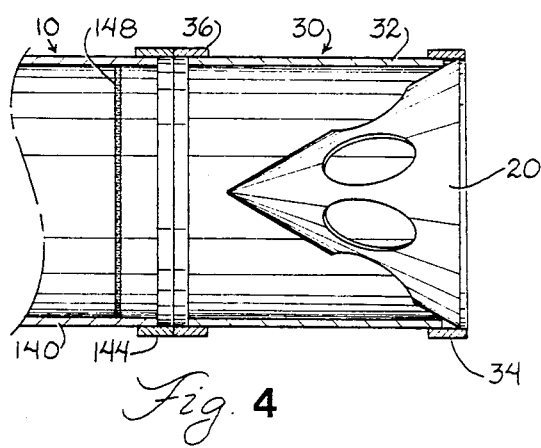
FIG. 4 depicts the cross-sectional view of telescope 10 with cone 20 used in an inverted fashion in telescope tube extender 30.

Referring now to FIG. 4, telescope tube housing 140 is shown as having a telescope tube extender 30 secured to light receiving end 144. Telescope tube extender 30 includes a cylinder support 32 having a cone mount 34 at one end thereof and an extender mount 36 at the top oppositely disposed therefrom. It is extender mount 36 that is magnetically secured to light receiving end 144 at the outer rim of the telescope 10. It is clear that other devices may be used to secure the telescope tube extender 30 to telescope 10. Telescope tube extender 30 serves the purpose of permitting cone 20 to be secured to the telescope 10 in an inverted fashion. The advantage of this particular structure is that a more efficient filtering of extraneous light is achieved.

Telescope tube extender 30 serves to an extent, to prevent formation of dew on the telescope 10. However, cone 20 and hexagon shield 98 are much more efficient. It is clear that tube extender 30, and cone 20 or hexagon shield 98 can be used in combination.

Figure 5:
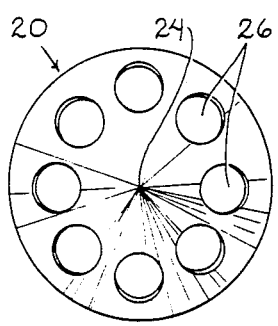
FIG. 5 depicts a top view of cone 20 from vertex 24.

Referring now to FIG. 5, a top view of cone 20 from vertex 24 is depicted. While it is clear from FIG. 1 and other Figures, that the apertures 26 are generally of an elliptical shape, it is clear from FIG. 5 that the top view of cone 20 is desired to produce a circular view of the elliptical shapes. It is the circular appearance from the top view that produces the most efficient light use. This is confirmed on a purely empirical basis.

Figure 6:
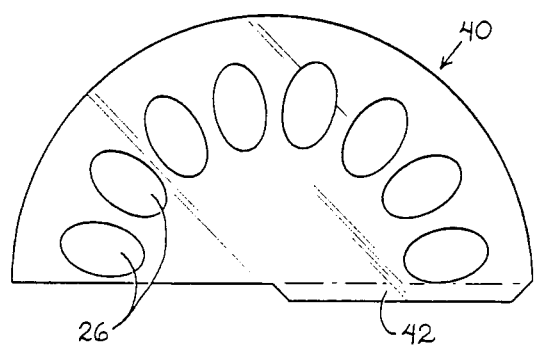
FIG. 6 depicts an one-half cone blank 40 for cone 20.

Referring now to FIG. 6, a one-half cone blank 40 is depicted. Half blank cone 40 includes apertures 26. It is clear from the structure, that half cone blank 40 having flap joint 42 for the purposes of forming the cone 20 will result in cone 20 having a greater height than the three quarter cone blank 60 shown in FIG. 7. Still, however, apertures 26 are cut elliptically to achieve the desired circular appearance from the top view.

Figure 7:
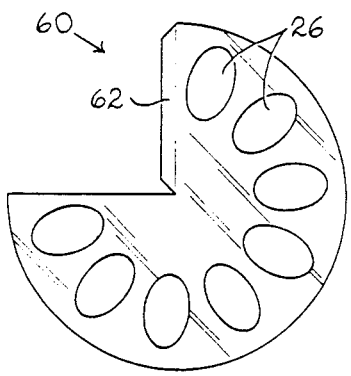
FIG. 7 depicts a three-quarters blank 60 for cone 20.

Referring now to FIG. 7, three-quarters cone blank 60 is depicted. Cone closure 62 enables three-quarter cone blank 60 to be formed into the shape of a cone 20 and achieve the desired results. Obviously, the three-quarter cone blank 60 forms cone 20 having substantially less height than the half cone blank 40—other variables being the same.

Figure 8:
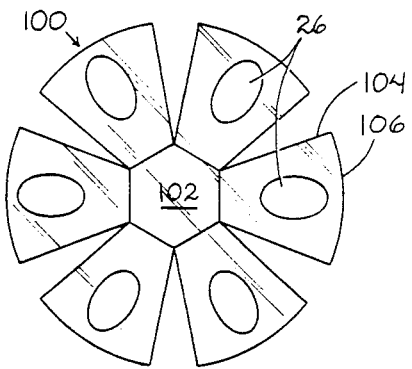
FIG. 8 depicts a hexagon blank 100 for hexagon functional shield 98.
Figure 9:
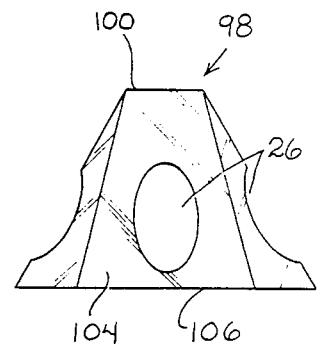
FIG. 9 depicts hexagon blank 100 formed into hexagon functional shield 98.

Referring now to FIG. 8 and FIG. 9; a hexagon blank 100 for forming a hexagonal functional shield 98 is depicted. Hexagon blank 100 includes a center hexagonal top 102 with aperture flaps 104 protruding from each side of the hexagon top 102. Aperture flaps 104 having an arced base 106 and include apertures 26. Arced base 106 sufficiently forms a flat circle when the hexagon blank 100 is formed into a functional shield 98 as shown in FIG. 9. In this fashion, hexagon shield 98 may be formed to achieved the desired results.

The key factor in forming the functional shield is that the functional shield protrudes from the light receiving lens 148 of telescope 10. In so protruding, the dew formation on light receiving lens 148 is prevented or minimized with an extremely great efficiency. At the same time, the apertures 26 permit the light to flow to telescope 10.

Figure 10:
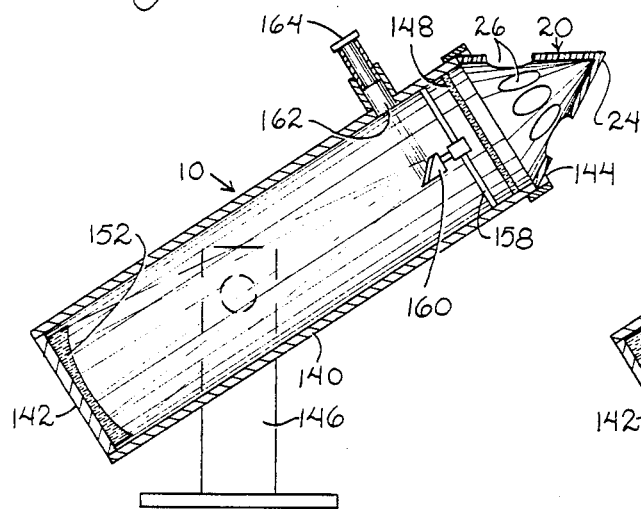
FIG. 10 depicts a cross-sectional view of telescope 10 with cone 20 in place focusing the light on the concave rear mirror 152 of telescope 10.

Referring now to FIG. 10, telescope 10 is shown in cross-section to illustrate the function of cone 20. Telescope 10 includes a tube housing 140 having a reflecting end 142 at one end thereof with a light receiving end 144 oppositely disposed therefrom. Tube housing 140 is mounted on a stand 146 in any standard fashion. Light receiving lens 148 is mounted in light receiving end 144 in the standard fashion.

Light receiving lens 148 passes light to rear mirror 152 mounted at reflecting end 142. Rear mirror 152 focuses the light thus received on a focusing mirror 160. Focusing mirror 160 then directs the light to viewing aperture 162 in tube housing 140 and thence to viewing magnifier 164. Light is focused on rear mirror 152 through apertures 26. Mirror mount 158 is a standard mirror mount adjacent to light receiving end 144 and has thereon a focus mirror 160 to receive the light from light receiving lens 148. The light is thus sent to the viewing aperture 162.

Figure 11:
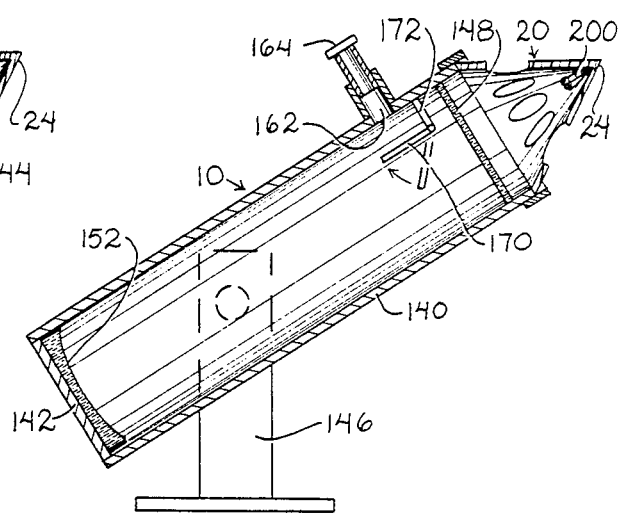
FIG. 11 depicts FIG. 10 with a light source 200 secured in the vertex 24 of cone 20.

Referring now to FIG. 11, light source 200 is mounted in vertex 24 of cone 20. This light source 200 permits use of telescope 10 itself to achieve a correct aiming of the telescope 10. Beams of light reflected off of concave rear mirror 152 pierce the night sky indicating appropriate aiming of the telescope. Light source 200 is aimed for most efficient results at the center of curvature of concave rear mirror 152 and is coincident therewith. Thus the telescope 10 acts as a searchlight to help aim telescope 10 roughly at points in the dark sky.

Figure 12:
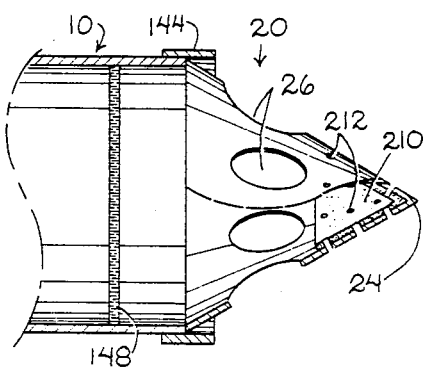
FIG. 12 depicts cone 20 with darkened sponge 210 secured in the vertex 24 of cone 20.

Considering FIG. 12 now, cone 20 is depicted in partial cross-section with darkened sponge 210 glued or otherwise secured therein. Breathing apertures 212 permit passage of air. Moisture is collected from the air by sponge 210 to assist in the prevention of dewing on telescope 10. The dark color of sponge 210 prevents extraneous light reflection from sponge 210, while providing the desired dew protection.

Figure 13:
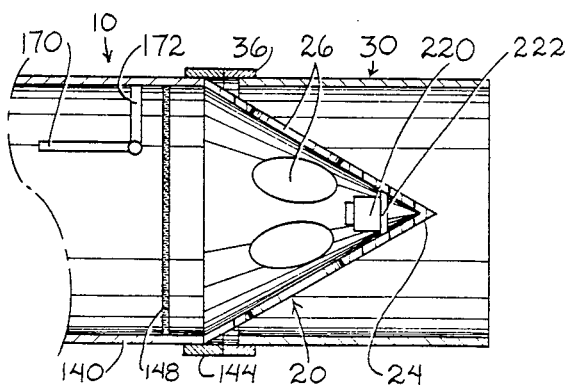
FIG. 13 depicts the cross-sectional view of telescope 10 with cone 20 used in telescope tube extender 30.

Referring now to FIG. 13, camera 220 location is also suitable for prime focus photgraphy by replacing light source 200 with camera 220. Camera 220 is any suitable camera capable of being mounted in vertex 24. Camera bracket 222 is glued or otherwise secured in vertex 24 and adapted to hold camera 220 in the appropriate position.

Tube extender 30 is in place in FIG. 13, to serve as a dewcap to prevent formation of dew on the light receiving lens 148 of telescope 10. Tube extender 30 also serves to help focus light for telescope 10. Together, cone 20 and tube extender 30 are synergistically more efficient than either is alone. Cone 20 is generally more efficient at dew prevention and light focusing than is tube extender 30. Cone 20 comments also apply to hexagonal functional shield 98 and other shapes for a shield to protrude from telescope 10.

Such aiming also provides for more efficient photographic use of telescope 10. Light source 200 is preferably battery powered for portability. However, any suitable power source may be used. To secure light source 200 in vertex 24, glue or other suitable securing means is used.

The focusing mirror 160 is replaced by a swing mirror 170 mounted on a swing mount 172. In this fashion, the telescope 10 can be adjusted and aimed at the appropriate point. Then swing mirror 170 is repositioned for viewing. Photographic purposes are also enhanced and proceed to achieve the desired results.

Any suitable material may be used to make the cone 20 or hexagon blank 100 of this invention. The material must be shapeable, but stiff. The shapes may molded, cut or otherwise formed. Cone 20 or hexagon shield 98 may be permanent or collapsible. Poster board is a suitable material. Plastics are also suitable. The collapsible aspect provides for easier transportation.

The following examples are intended to illustrate without unduly limiting the invention. The telescopes described in the examples and throughout the specification are standard telescopes—well understood by a person having ordinary skill in this art.

EXAMPLE 1

On a six inch aperture Schmidt Newtonian telescope Focal ratio 3.60 and Focal length 543 millimeter, the functional shield of cone 20 is used. Black poster board is suitable material for making the functional shield. The outside dimension of the base of the cone 20 is just under seven inches to fit inside the recess of the front end of the telescope such as light receiving end 144 of telescope 10.

Eight circles having a diameter of one and one-half (1½) inches are cut out and equally spaced at 45 degree angles from the center of the cone shield. Their outer edges are just under six (6) inches to match the aperture of the telescope. The inner edges, to the center thus had adequate clearance from the central obstruction of the telescope 10, which holds the secondary diagonal mirror 160. This gave the right opening unobstructed pathways for the entering light.

The telescope 10 is used in hazy, clear, and partly cloudy skies. A variety of eyepieces four (4) millimeter, 20 millimeter, 28 millimeter, and 32 millimeter Focal lengths are used.

EXAMPLE 2

Also cut is a cone 20 for a 12.5 inches Newtonian telescope, the outer dimensions being 14 inches to just fit inside the front end of the light receiving end 144 of telescope tube housing 140 up to the back of the diagonal mirror mount 158. Apertures of a diameter of 3.5 inches are cut so the outside limit from the center of the cone shield for cone 20 is 11.5 inches. Six apertures are cut at 60° angles to provide six unobstructed pathways for the incoming light. The number of apertures 26 cut can vary according to the size of the diagonal compared to the telescopes main aperture, that is (before the cone shield is installed aperture). About three to a dozen or more apertures 26 might be used to optimize the available apertures for different telescopes.

The reason, that the telescope 10 with the cone 20 shield performs in such a way as to give a plainer image, may be complex. A possible theory revolves around the generally accepted theory that a clear aperture telescope 10 gives a plainer view than a telescope 10 with a central obstruction. By cutting the apertures 26 away from the central obstruction a group of smaller aperture unobstructed telescopes is created in effect with a common focus. These smaller telescopes give a larger airy disk and an intensified image compared to a single small telescope.

Contrast, being improved by an airy disk size being larger, makes the object being viewed more plain to see, and light grasp being reduced somewhat by the larger overall obstruction is more than offset by the plainer view. The apertures 26 in a group surround a central obstruction of the cone 20 shield. However, the fact that the apertures 26 themselves do not have a central obstruction may be a key to why the plain view through the telescope 10 takes place.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent by the United States is:

1. A unitary, combined-purpose, functional shield for a telescope, said telescope having a light receiving end, to assist with focusing of light in a telescope and protecting of said telescope from dew wherein:
   a. said shield has a closed end and an open end to form a cap for a lens of said telescope to achieve protection from dew for said telescope;
   b. said cap has at least two apertures between said open end and said closed end symmetrically spaced around said cap,
   c. said open end is of sufficient size to cover said telescope lens; and
   d. said shield protrudes from said light receiving end.

2. The shield of claim 1 wherein:
   a. said shield has a shape similar to a cone;
   b. said closed end is a vertex of said cone; and
   c. said open end is a base of said cone.

3. The shield of claim 2 wherein:
   a. said cone is shaped from a flexible material; and
   b. said flexible material has a shape of three-quarters of a circle;
   c. said apertures are of equal distance from a center of said circle.

4. The shield of claim 2 wherein:
   a. said cone is shaped from a flexible material; and b. said flexible material has a shape of one-half of a circle;

c. said apertures are of equal distance from a center of said circle.

5. The shield of claim 2 wherein said apertures are elliptical in shape.

6. The shield of claim 5 wherein:
a. said cone is shaped from a flexible material; and
b. said flexible material has a shape of three-quarters of a circle;
c. said apertures are of equal distance from a center of said circle.

7. The shield of claim 5 wherein:
a. said cone is shaped from a flexible material;
b. said flexible material has a shape of one-half of a circle; and
c. said apertures are of equal distance from a center of said circle.

8. The shield of claim 1 wherein:
a. said shield has a regular, hexagonally-shaped and centrally located top portion;
b. said shield is shaped from a flexible material; and
c. said top portion has six equal sides;
d. an aperture flap continues from each of said six equal sides;
e. said aperture flap contains therein a light receiving aperture;
f. said aperture flap has an arced base opposite from said top portion;
g. said shield includes six of said arced bases; and
h. said six arced base forms a circle when shaped into said shield.

9. The shield of claim 8 wherein said shield has a light source secured to said closed end and aimed toward said open end.

10. The shield of claim 1 wherein said shield has a light source secured to said closed end and aimed toward said open end.

11. The shield of claim 5 wherein:
a. said cone is shaped from a flexible material; and
b. said flexible material has a shape of three-quarters of a circle;
c. said apertures are of equal distance from a center of said circle.

12. The shield of claim 11 wherein said shield has a light source secured to said closed end and aimed toward said open end.

13. The shield of claim 5 wherein:
a. said cone is shaped from a flexible material; and
b. said flexible material has a shape of one-half of a circle;
c. said apertures are of equal distance from a center of said circle.

14. The shield of claim 13 wherein said shield has a light source secured to said closed end and aimed toward said open end.

15. The shield of claim 1 wherein:
a. said shield further includes a tube extender; and
b. said tube extender surrounds said shield.

16. The shield of claim 15 wherein said closed end is adjacent said telescope.

17. The shield of claim 15 wherein said open end is adjacent said telescope.

18. A unitary, combined-purpose, functional shield for a telescope, said telescope having a light receiving end and a lens arrangement suitable for viewing astronomical bodies, to assist with focusing of light in a telescope and protecting of said telescope from dew wherein:
a. said shield has a shape of a hollow, generally conically shaped cap for a lens in said light receiving end of said telescope to achieve protection from dew for a telescope;
b. said cap has a conical shape;
c. said conical shape has a base and a vertex oppositely disposed from said base;
d. said conical shape is hollow;
e. said cap has a plurality of apertures between said base and said vertex symmetrically spaced around said conical shape; and
f. said conical base is of sufficient size to cover said telescope lens.

19. An astronomical telescope having a light receiving end and a lens arrangement suitable for viewing astronomical bodies, the improvement comprising a unitary, combined-purpose, functional shield wherein:
a. said unitary, combined-purpose, functional shield provides both a light mask and a dew protector to minimize formation of dew on a lens of said telescope;
b. said functional shield has a conical shape;
c. said conical shape has a base and a vertex oppositely disposed from said base;
d. said conical shape is hollow;
e. said functional shield has a plurality of apertures between said base and said vertex symmetrically spaced around said conical shape; and
f. said conical base is of sufficient size to cover said lens at said light receiving end.

* * * * *